United States Patent
DiBenedetto et al.

(10) Patent No.: US 11,798,303 B2
(45) Date of Patent: Oct. 24, 2023

(54) COMPOSABLE BLUEPRINTS

(71) Applicant: DREAM BOOK, LLC, Avon, OH (US)

(72) Inventors: Michael S. DiBenedetto, Avon, OH (US); Tony Stanfar, Avon, OH (US); Rand Lennox, Avon, OH (US)

(73) Assignee: Dream Book, LLC, Avon, OH (US)

( * ) Notice: Subject to any disclaimer, the term of this patent is extended or adjusted under 35 U.S.C. 154(b) by 0 days.

(21) Appl. No.: 17/517,200

(22) Filed: Nov. 2, 2021

(65) Prior Publication Data

US 2022/0138462 A1    May 5, 2022

Related U.S. Application Data

(60) Provisional application No. 63/108,566, filed on Nov. 2, 2020.

(51) Int. Cl.
| | | |
|---|---|---|
| *G06F 17/00* | (2019.01) | |
| *G06V 30/414* | (2022.01) | |
| *G06F 16/93* | (2019.01) | |
| *G06V 30/422* | (2022.01) | |

(52) U.S. Cl.
CPC ............ *G06V 30/414* (2022.01); *G06F 16/93* (2019.01); *G06V 30/422* (2022.01)

(58) Field of Classification Search
CPC .... G06V 30/414; G06V 30/422; G06F 16/93; G06F 30/13; G06F 16/532; G06F 2111/12; G06F 2111/16; G06F 30/12
See application file for complete search history.

(56) References Cited

U.S. PATENT DOCUMENTS

| | | | |
|---|---|---|---|
| 8,621,818 B1* | 1/2014 | Glenn | E04B 1/3483 52/309.7 |
| 2014/0095122 A1* | 4/2014 | Appleman | G06T 19/003 703/1 |
| 2016/0027051 A1* | 1/2016 | Gross | G06V 20/20 705/14.54 |
| 2016/0092886 A1* | 3/2016 | Ramey | G06Q 30/018 705/317 |
| 2021/0004508 A1* | 1/2021 | Williams | G06F 30/12 |

OTHER PUBLICATIONS

Goncu, Cagatay, et al. "Accessible on-line floor plans." Proceedings of the 24th international conference on World Wide Web. 2015 (Year: 2015).*

* cited by examiner

*Primary Examiner* — Andrew T McIntosh
(74) *Attorney, Agent, or Firm* — Renner, Otto, Boisselle & Sklar, LLP

(57) ABSTRACT

The techniques disclosed herein include a blueprint compositing technique that may process blueprint data to generate multiple composable components. The multiple composable components may be processed to produce multiple blueprint component options including a master blueprint. A master blueprint and at least one other blueprint component option may be selected. A composited blueprint may be produced based on the selections of the master blueprint and the at least one other blueprint component option.

20 Claims, 6 Drawing Sheets

```
Create output blueprint (out)
Open Selected Master blueprint (in)
For each selected structural anchor (SA) in (in)
    Copy selected SA to output
    For each selected variation (V) in SA
        Calculate V layer positioning
        Copy & position selected V to output
    End For
    (Recursion R1) For each selected block (B) in SA
        Calculate B layer positioning
        Copy & position selected B to output
        For each selected variation (V') in block B
            Calculate V' layer positioning
            Copy & position selected V' to output
        End For
        For each child block (CB) in B
            Invoke Recursion R1(CB)
        End For
    End For
End For
Save output blueprint to DWG
Create output blueprint PDF
For each selected structural anchor (SA) in output blueprint
    Create floor plan SVG page
    Add SVG page to PDF
End For
Insert or append metadata, cover page, and renderings to PDF
Save output blueprint PDF
```

Figure 5

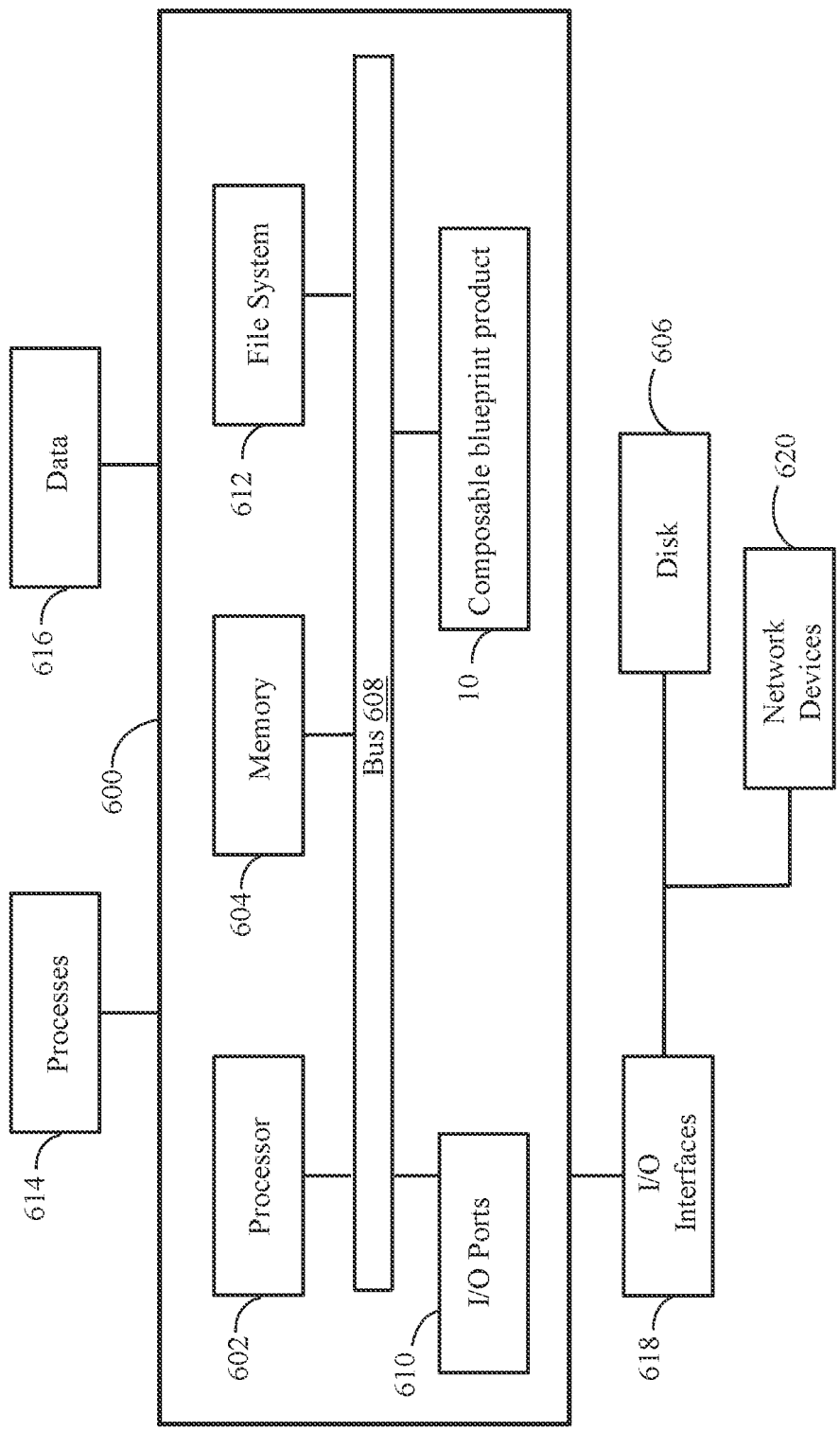

COMPOSABLE BLUEPRINTS

BACKGROUND

In the process of blueprint design, a designer may wish to include a number of variations for different features of the blueprint. Typically, a different blueprint needs to be separately developed for each variation. This results in a number of different, independently developed blueprints that need to be considered in the final blueprint product. Additionally, in the event that a designer wishes to extend or enhance an existing blueprint product, a designer typically needs to rebuild or redesign the previously developed blueprint to create a new extended or enhanced blueprint product.

SUMMARY

A composable blueprint product and a method for creating a composable blueprint product of the present disclosure improve on existing blueprint products in various significant ways. For example, a method is provided for compositing designs from multiple, independently developed blueprints and composing them into a single, customized blueprint that maintains structural integrity.

Additionally, a method is provided for pre-rendering blueprint visualizations of each of a plurality of design variations to support rapid visualization of the composited blueprint. The present disclosure also provides a method for adding additional composable components to an existing blueprint, thereby allowing for the extension and/or enhancement of an existing blueprint product without the need to rebuild or redesign the previously developed blueprint.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

FIG. 5 illustrates exemplary pseudocode representing instructions executable to perform compositing operations in a memory in accordance with the techniques of the present disclosure.

FIG. 6 illustrates a block diagram of an exemplary machine for compositing a blueprint.

DETAILED DESCRIPTION

The techniques presented herein may provide a highly composable blueprint product and a method for creating a highly composable blueprint product. The techniques of the present disclosure may also provide methods for pre-rendering blueprint visualizations of each of a plurality of design variations to support rapid visualization of the composited blueprint, and for adding additional composable components to an existing blueprint, thereby allowing for the extension and/or enhancement of an existing blueprint product without the need to rebuild or redesign the previously developed blueprint.

Key parts may include coding composable components based on blueprint data of multiple blueprints, rendering at least a portion of the coded composable components including a master blueprint option, extracting the coding information to build a blueprint component option database, and producing a composited blueprint product based on the master blueprint option and at least one other blueprint component option.

Figure 1:
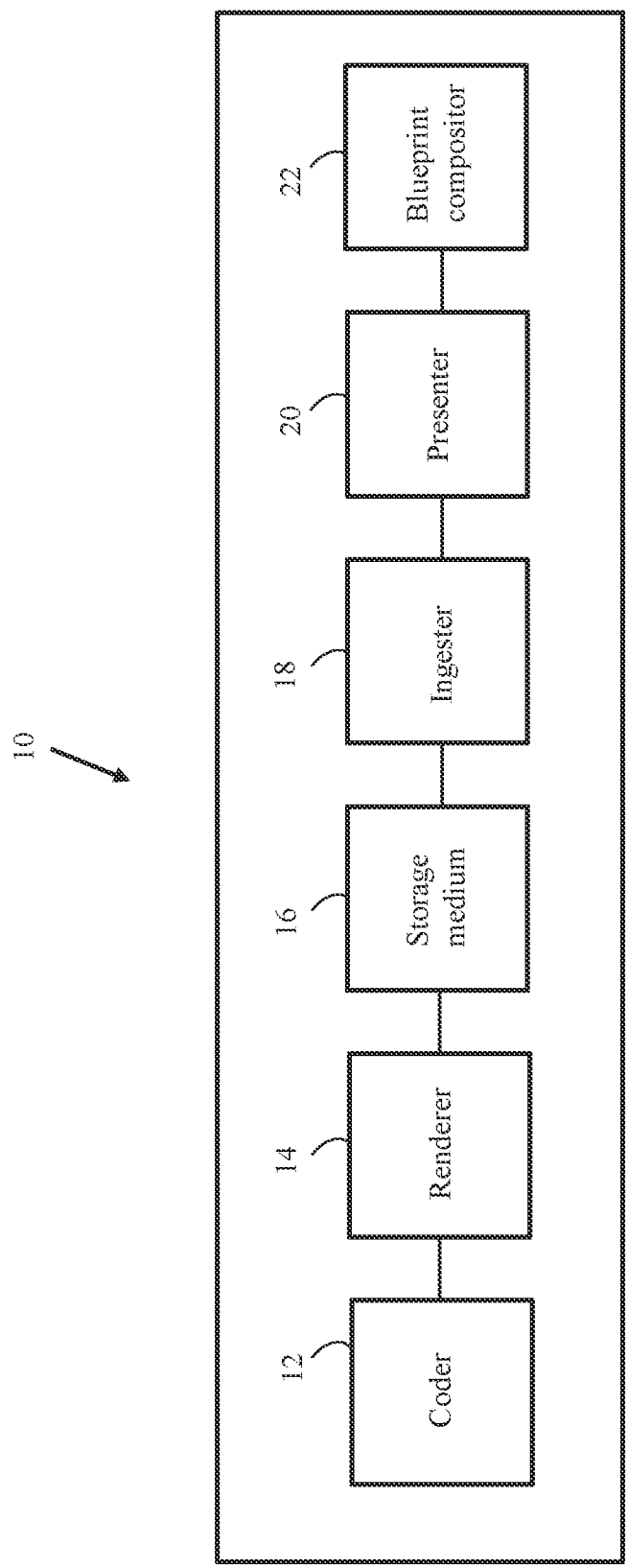
FIG. 1 illustrates a block diagram of an exemplary embodiment of a composable blueprint product for compositing a blueprint.

With reference to FIG. 1, a highly composable blueprint product 10 may include a coder 12, a renderer 14, a storage medium 16, an ingester 18, a presenter 20, and a blueprint compositor 22.

Figure 2:
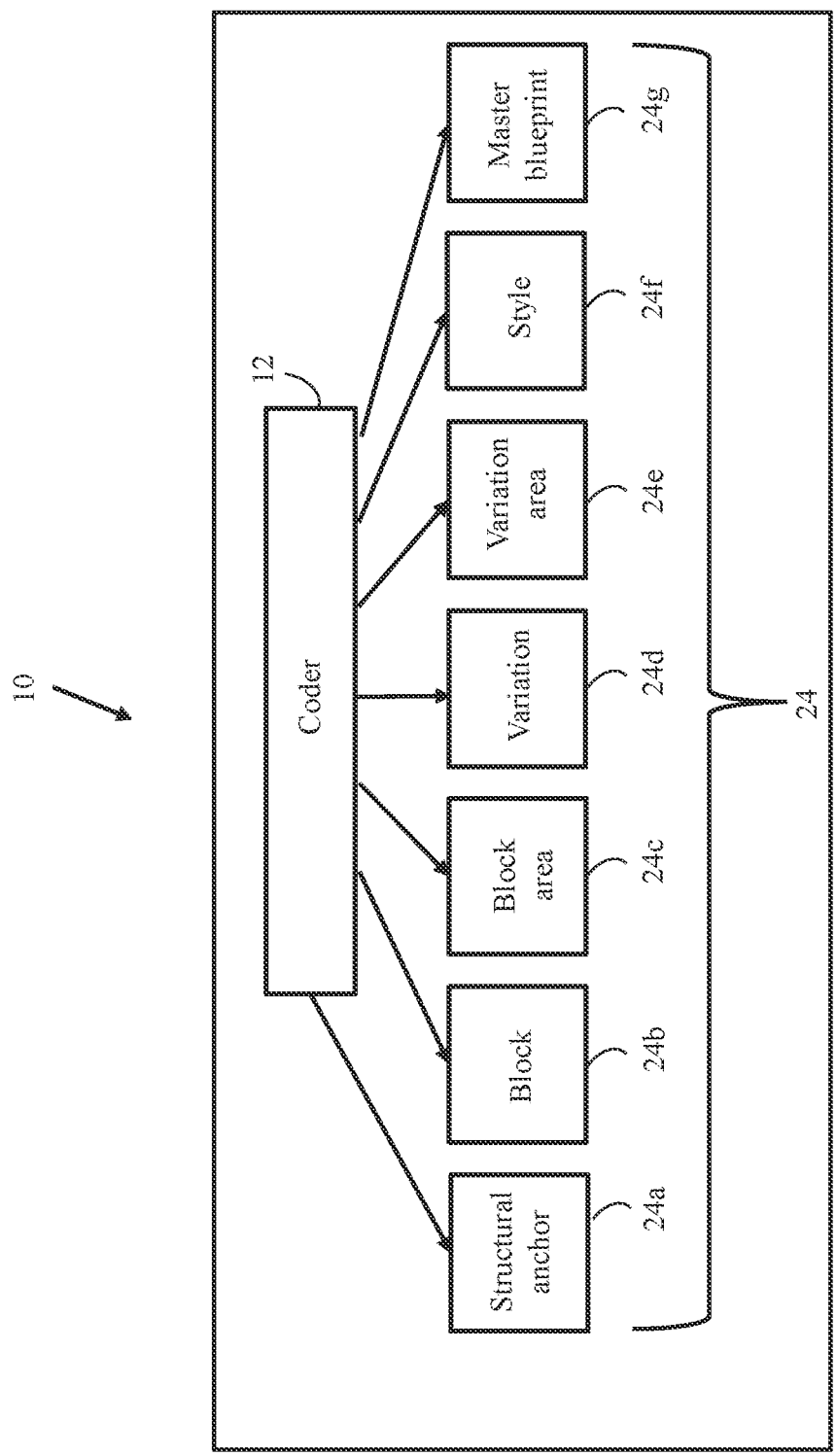
FIG. 2 illustrates a block diagram of an exemplary embodiment of a coder and a plurality of composable components.

With reference to FIG. 2, the coder 12 may process blueprint data associated with multiple, different, and/or independently developed blueprints. More particularly, the coder 12 may code a plurality of composable components 24 based, at least in part, on the blueprint data. The plurality of composable components 24 may be utilized to create a customized, single, composited blueprint as further described below.

In some implementations, the plurality of composable components 24 may include structural anchors 24a, blocks 24b, block areas 24c, variations 24d, variation areas 24e, styles 24f, and master blueprints 24g, each of which may serve a particular purpose. Before describing each of the plurality of composable components 24 in further detail, a general overview of the plurality of composable components 24, as they relate to the compositing techniques of the present disclosure, will be provided herein.

Generally, the plurality of composable components 24 may primarily take on four different roles in the compositing process, with one or more of the plurality of composable components 24 being utilized in the four roles.

For example, the first role of the plurality of composable components 24 may relate to components that serve as compositing components, and that are selected and reassembled in various combinations to form the customized, single, composited blueprint. These composable components may be representative of design elements, or design options, associated with the multiple, different, and/or independently developed blueprints. For this role, the structural anchors 24a, the blocks 24b, and the variations 24d may be utilized.

The second role of the plurality of composable components 24 may relate to composable components that serve as positioning mechanisms in the compositing process. For this role, the block areas 24c and the variation areas 24e may be utilized.

The third role of the plurality of composable components 24 may relate to composable components that serve as linking mechanisms associated with renderings in the composite process. For this role, the styles 24f may be utilized.

The fourth role of the plurality of composable components 24 may relate to composable components that serve as representations of completed composited blueprints that may be further modified, if desired. For this role, the master blueprints 24g may be utilized.

Now that a general overview of the plurality of composable components 24, as they relate to the compositing techniques of the present disclosure, have been provided, each of the plurality of composable components 24 will be discussed below.

The structural anchors 24 may primarily correspond to fundamental design elements, necessary design elements, habitability design elements, unchangeable design elements, and/or unique design elements required to maintain uniqueness of a design, each of which being associated with one or more of the multiple, independent blueprints.

Exemplary design elements that the structural anchors 24a may correspond to include overall external dimensions of a structure, a layout of a structure, non-movable internal areas that are required for structural integrity, areas associated with heating, ventilation, and air conditioning (HVAC) runs, and/or a unique exterior wall of a blueprint.

To represent the design elements, or the design options, the coder 12 may code the structural anchors 24a to include data corresponding to blueprint data representative of particular design elements, or particular design options, of one or more of the multiple, different, and/or independently developed blueprints.

In coding the structural anchors 24a, the coder 12 may define the structural anchors 24a according to a pre-defined, coded layer naming system. The coded layer naming system may utilize a comparator that is culture-insensitive, case-insensitive, and whitespace-cleaned for grouping design elements with related and/or similar names (e.g., "n-first floor"="n-FirstFloor"="n-First flöór").

The coded layer naming system (as it relates to the structural anchors 24a) may include an anchor name section, an anchor option name section, and an anchor component section. The coded layer naming system may utilize a format of SA:{n-Anchor Name}.{o-Option Name}.{c-Component} to define the structural anchors 24a.

By way of example, if a design element of a blueprint is a "first-floor layout having a large kitchen floorplan," the coder 12 may code the structural anchor 24a to include data corresponding to blueprint data representative of the "first-floor layout having the large kitchen floorplan" design elements of the associated blueprint or blueprints. In this example, the coder 12 may define the structural anchor as "SA:n-FirstFloor.o-LargeKitchen.c-Floorplan."

In this example, the anchor name section is "FirstFloor," which corresponds to a first floor layout design element of an associated blueprint or blueprints, the anchor option name section is "LargeKitchen," which corresponds to a large kitchen design element of an associated blueprint or blueprints, and the anchor component name section is "Floorplan," which corresponds to a floorplan design element of an associated blueprint or blueprints.

One exemplary benefit of utilizing the coded layer naming system technique is that it provides a wide range of customizability in forming the structural anchors 24 (e.g., any design element, or design option, from any of the blueprints may be coded as a structural anchor 24a).

For example, to swap the "large kitchen floorplan" design element of the structural anchor 24a having the "first-floor layout having a large kitchen floorplan" with a "small kitchen floorplan" design element, the coder 12 may swap the anchor name option section (i.e., "LargeKitchen") with the anchor name option section associated with the "small kitchen floorplan" (i.e., "SmallKitchen") resulting in a defined name of "SA:n-FirstFloor.o-SmallKitchen.c-Floorplan."

As another example, to swap the "Floorplan" design element of the structural anchor 24a having the "first-floor layout having a large kitchen floorplan" with an "electrical plan" design element, the coder 12 may swap the anchor component section (i.e., "Floorplan") with the anchor component section associated with the "electrical plan" (i.e., "ElectricalPlan") resulting in a defined name of "SA:n-FirstFloor.o-LargeKitchen.c-Electrical Plan."

A further customizability option associated with the compositing techniques of the present disclosure relates to structural anchors 24a that may be utilized as a composable component in more than one composited blueprint (e.g., a structural anchor 24a that may be utilized in two master blueprints, one master blueprint and a different composited blueprint, etc.). In these scenarios, the coder 12 may define the structural anchor 24a in a manner that allows the structural anchor to 24b be utilized as a composable component in more than one composited blueprint.

For example, the coder 12 may code a structural anchor 24a having an "exterior wall" design element that may be composited into more than one composited blueprint as "SA:n-ExteriorWalls.c-Floorplan." In this example, the anchor option name section was removed allowing the structural anchor 24a to be utilized as a composable component in more than one composited blueprint.

As another example, the coder 12 may code a structural anchor 24a having a "floor plan" design element that may be composited into more than one composited blueprint as "SA:n-FirstFloor.c-Floorplan." In this example, the anchor option name section was removed allowing the structural anchor 24a to be utilized as a composable component in more than one composited blueprint.

As such, the coder 12 may utilize the anchor name section, the anchor option name section, and the anchor component section to customize the structural anchors 24a in any suitable manner.

A block 24b may primarily correspond to design elements, or design options, associated with one or more of the multiple, different, and/or independently developed blueprints that fill a space of a composited blueprint. A space may be defined as an area within one or more structural anchors 24a or an area within one or more different blocks 24b.

Similar to structural anchors 24a, to represent the design elements, or the design options, the coder 12 may code the blocks 24b to include data corresponding to blueprint data representative of particular design elements, or particular design options, of one or more of the multiple, different, and/or independently developed blueprints. This may be accomplished by utilizing the coded layer naming system as modified for the blocks 24b.

More particularly, the coded layer naming system (as it relates to the blocks 24b) may include a block area name section, a block target option name section, a block option name section, and a block component section. The coded layer naming system may utilize a format of B:{a-Block Area Name}.{t-Target Option Name}.{o-Option Name}.{c-Component}.

Similar to the structural anchors 24a, the blocks 24b may be utilized as a composable component in more than one composited blueprint (e.g., a block 24b that may be utilized in two master blueprints, one master blueprint and a different composited blueprint, etc.). In these scenarios, the coder 12 may define the block 24*b* in a manner that allows the block 24*b* to be utilized as a composable component in more than one composited blueprint.

For example, the coder 12 may code a block 24*b* having a "bedroom layout" design element that may be composited into more than one composited blueprint as "B:a-Bedroom.c-FloorPlan." In this example, the block target option name section and the block option name section were removed allowing the block 24*b* to be utilized as a composable component in more than one composited blueprint.

Block areas 24*c* may be defined as locations, positions, or areas associated with one of the structural anchors 24*a* or one of the blocks 24*b*. The block areas 24*c* may be utilized as a mechanism for compositing blocks in an area within one of the structural anchors 24*a* or an area within one of the blocks 24*b*.

One exemplary benefit of using the blocks 24*b* is that the blocks 24*b* may be used to offer multiple design element options associated with a feature or features of the blueprints.

For example, two different blocks 24*b* may be coded with different design elements and either of the blocks 24*b* may be placed within a structural anchor 24*a* utilizing the block area 24*c*.

In this example, a first design element of a blueprint may be a "sink by a window" and the coder 12 may code a first block 24*b* to include data corresponding to blueprint data representative of the "sink by a window" design elements of the associated blueprint or blueprints. In this example, the coder 12 may define the first block 24*b* as "B:a-Kitchen.t-LargeKitchen.o-SinkByWindow.c-FloorPlan."

The block area name section is "Kitchen," which corresponds to the area within the kitchen where the design elements may be positioned, the target option name section is "LargeKitchen," which corresponds to a large kitchen design element of an associated blueprint or blueprints, the block option name section is "SinkByWindow," which corresponds to the "sink by a window" design element of the associated blueprint or blueprints, and the block component section is "FloorPlan," which corresponds to a floorplan design element of an associated blueprint or blueprints.

A second design element of a blueprint may be a "sink in an island" and the coder 12 may code a second block 24*b* to include data corresponding to blueprint data representative of the "sink in an island" design elements of the associated blueprint or blueprints. In this example, the coder 12 may define the second block 24*b* as "B:a-Kitchen.t-LargeKitchen.o-SinkInIsland-c-FloorPlan."

The coded name of the second block 24*b* may be identical except as to the block option name section. The block option name section of the second block is "SinkInIsland," which corresponds to the "sink in an island" design element of the associated blueprint or blueprints.

A third design element may be a "large kitchen" associated with a structural anchor 24*a* and the coder 12 may code the structural anchor 24*a* to include data corresponding to blueprint data representative of at least the "large kitchen" design element of the associated blueprint or blueprints. In this example, the coder 12 may define the structural anchor as "SA:n-FirstFloor.o-LargeKitchen.c-Floorplan.").

The anchor name section is "FirstFloor," which corresponds to a first floor layout design element of an associated blueprint or blueprints, the anchor option name section is "LargeKitchen," which corresponds to a large kitchen design element of an associated blueprint or blueprints, and the anchor component name section is "Floorplan," which corresponds to a floorplan design element of an associated blueprint or blueprints.

Either the first block 24*b* corresponding to the "sink by a window" design element or the second block 24*b* corresponding to the "sink in an island" design element may be positioned within the structural anchor 24*a* corresponding to at least the "large kitchen" design element at a position designated by the block area 24*c*. As such, the blocks 24*b* and the block areas 24*c* may be utilized to offer multiple design element options for a feature or features of the blueprints.

Variations 22*d* may be defined as refinements that may be used in the structural anchors 24*a* or the blocks 24*b*. The variations 22*d* may provide mutually exclusive options associated with the composited blueprints.

Similar to structural anchors 24*a*, to represent the design elements, or the design options, the coder 12 may code the variations 24*d* to include data corresponding to blueprint data representative of particular design elements, or particular design options, of one or more of the multiple, different, and/or independently developed blueprints. This may be accomplished by utilizing the coded layer naming system as modified for the blocks 24*b*.

More particularly, the coded layer naming system (as it relates to the variations 24*d*) may include variation area name section, a variation target option name section, a variation name section, and a variation option section. The coded layer naming system may utilize a format of V:{a:Variation Area Name}.{t-Target Option Name}.{v-Variation Name}.{n-Option Name}.

Similar to the structural anchors 24*a* and the blocks 24*b*, the variations 22*d* may be utilized as a composable component in more than one composited blueprint (e.g., a variation 24*d* may be utilized in two master blueprints, one master blueprint and a different composited blueprint, etc.). In these scenarios, the coder 12 may define the variation 24*d* in a manner that allows the variation 24*d* to be utilized as a composable component in more than one composited blueprint.

For example, the coder 12 may code a variation 24*d* having a "ceiling trim with no crown moulding" design element that may be composited into more than one composited blueprint as "V:v-CeilingTrim.n-NoCrownMoulding." In this example, the variation area name section and the variation target option name section were removed allowing the variation 24*d* to be utilized as a composable component in more than one composited blueprint.

As another example, the coder 12 may code a variation 24*d* having a "ceiling trim with crown moulding" design element that may be composited into more than one composited blueprint as "V:v-CeilingTrim.n-CrownMoulding." In this example, the variation area name section and the variation target option name section were removed allowing the variation 24*d* to be utilized as a composable component in more than one composited blueprint.

Similar to block areas 24*c*, the variation areas 24*e* may be defined as locations, positions, or areas associated with the structural anchors 24*a* or the blocks 24*b*. The variation areas 24*e* may be utilized as a mechanism for compositing blocks in an area within the one of the structural anchors 24*a* or an area within one of the blocks 24*b*.

One exemplary benefit of using the variations 24*d* is that the variations 24*d* may be used to offer multiple design element options associated with a feature or features of the blueprints.

For example, two different variations 24d may be coded with different design elements and either of the variations 24d may be placed within a structural anchor 24a utilizing the variation area 24e.

In this example, a first design element of a blueprint may be a "bay window" and the coder 12 may code a first variation 24d to include data corresponding to blueprint data representative of the "bay window" design element of the associated blueprint or blueprints. In this example, the coder 12 may define the first variation 24d as "V:a-Kitchen.t-LargeKitchen.v-PictureWindow.n-Include Bay Window."

The variation area name section is "Kitchen," which corresponds to the structural anchor 24a associated with the variation 24d, the target option name section is "LargeKitchen," which corresponds to a large kitchen design element of an associated blueprint or blueprints, the variation name section is "PictureWindow" which corresponds to the area within the kitchen where the design element may be positioned, and the variation option name is "Include Bay Window," which corresponds to a "bay window" design element of an associated blueprint or blueprints.

A second design element of a blueprint may be a "wall with no bay window" and the coder 12 may code a second variation 24d to include data corresponding to blueprint data representative of the "wall with no bay window" design element of the associated blueprint or blueprints. In this example, the coder 12 may define the second variation 24d as "V:a-Kitchen.t-LargeKitchen.v-PictureWindow.n-No Bay Window."

The coded name of the second variation 24d may be identical except as to the variation option name section. The variation option name section of the second variation 24d "No Bay Window," which corresponds to the "wall with no bay window" design element of the associated blueprint or blueprints.

A third design element may be a "large kitchen" associated with a structural anchor 24a and the coder 12 may code the structural anchor 24a to include data corresponding to blueprint data representative of at least the "large kitchen" design element of the associated blueprint or blueprints. In this example, the coder 12 may define the structural anchor as "SA:n-FirstFloor.o-LargeKitchen.c-Floorplan.").

The anchor name section is "FirstFloor," which corresponds to a first floor layout design element of an associated blueprint or blueprints, the anchor option name section is "LargeKitchen," which corresponds to a large kitchen design element of an associated blueprint or blueprints, and the anchor component name section is "Floorplan," which corresponds to a floorplan design element of an associated blueprint or blueprints.

Either the first variation 24d corresponding to the "bay window" design element or the second variation 24d corresponding to the "wall with no bay window" design element may be positioned within the structural anchor 24a corresponding to at least the "large kitchen" design element at a position designated by the variation area 24e. As such, the variations 24d and variation areas 24e may be utilized to offer multiple design element options for a feature or features of the blueprints.

Styles 24f may link renderings with associated design elements in a composited blueprint, allowing visualization of a final composited blueprint product. Stated otherwise, styles 24f may be grouped definitions of interior or exterior design themes that may be utilized for linking renderings to multiple views of the structural anchors 24a, the blocks 24b, the variations 24d, and/or the master blueprints 24g. As such, styles 24f are associated with the renderer 14.

The renderer 14 may render the structural anchors 24a, the blocks 24b, the variations 24d, and/or the master blueprints 24g. In some implementations, the renderings of the structural anchors 24a, the blocks 24b, the variations 24d, and/or the master blueprints 24g are completed as soon the structural anchors 24a, the blocks 24b, the variations 24d, and/or the master blueprints 24g are coded. One exemplary benefit of this is that pre-rendering visualizations of each of the structural anchors 24a, the blocks 24b, the variations 24d, and/or the master blueprints 24g may be provided to support rapid visualization of the composited blueprint.

As an example of utilizing the styles 24f, if a style 24f is a "Farmhouse" style, the renderer 14 may develop renderings that target all design elements within a composited blueprint associated with the Farmhouse style.

As additional examples, if a style 24f is a "Gray Kitchen with Subway Tile" style 24f, the renderer 14 may develop renderings that target all kitchen blocks design elements within a composited blueprint, and if a style 24f is a "Coastal with vertical siding" style, the renderer 14 may develop an exterior rendering of an overall blueprint (the elevation). As such, styles 24f link renderings with selected design elements in a composited blueprint, allowing rapid visualization of the final composited blueprint product.

The storage medium 16 may store the plurality of composable components 24 (i.e., the structural anchors 24a, the blocks 24b, the block areas 24c, the variations 24d, the variation areas 24e, the styles 24f, and/or the master blueprints 24g) for further processing. The plurality of composable components 24 may be stored in DWG file format or any other suitable format.

The ingester 18 may ingest the plurality of composable components 24 to extract coding information associated with each of the plurality of coded components 24 to produce a plurality of blueprint component options 26. More particularly, the ingester 18 may ingest each of the structural anchors 24a, the blocks 24b, the block areas 24c, the variations 24d, the variation areas 24e, the styles 24f, and/or the master blueprints 24g to extract coding information and to produce structural anchor options 26a, block options 26b, block area options 26c, variation options 26d, variation area options 26e, style options 26f, and/or master blueprint options 26g.

The ingester 18 may produce a scalable vector graphics (SVG) file, or any other suitable file, for each of the plurality of blueprint component options 26. In some implementations, the ingestion process is an idempotent process to allow re-ingestion of existing composable components that may have been extended to add new design elements associated with a blueprint or blueprints. The ingester 18 may be further configured to add metadata to the plurality of blueprint component options 26 to facilitate end user searching and selection of particular blueprint component options 26.

The storage medium 16 may store the plurality of blueprint component options 26 (i.e., the structural anchor options 26a, the block options 26b, the block area options 26c, the variation options 26d, the variation area options 26e, the style options 26f, and/or the master blueprint options 26g).

Figure 3:
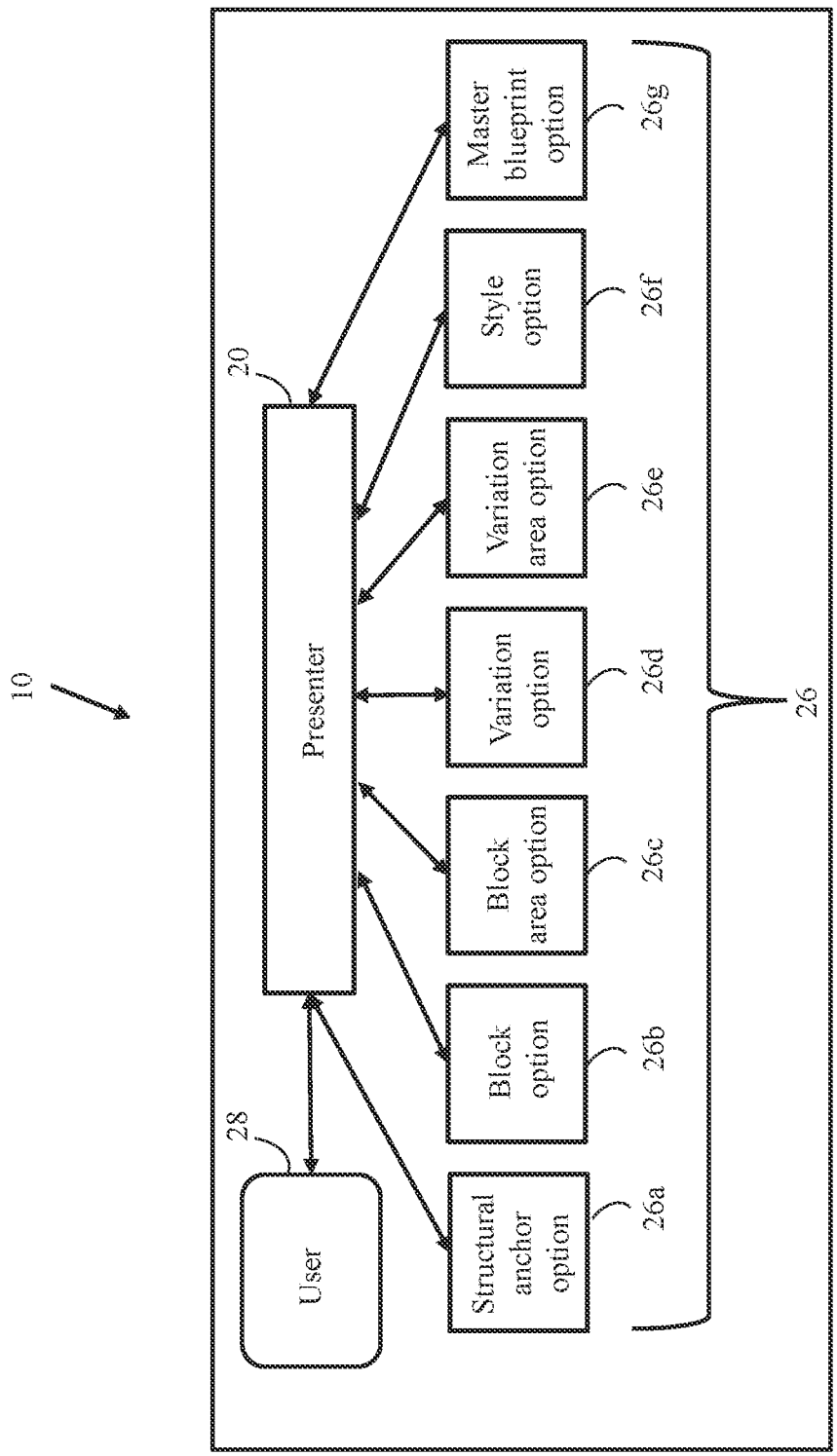
FIG. 3 illustrates a block diagram of an exemplary embodiment of a presenter, a plurality of blueprint component options, and a user.

With reference to FIG. 3, the presenter 20 may present the plurality of blueprint component options 26 to a blueprint creator or user 28. In some implementations, the presenter 20 may present one or more of the master blueprint options 26g to the user 28. The user 28 may select one of the master blueprint options 26g.

In some implementations, before the user 28 selects the master blueprint option 26g, the user 28 may input, or select, at least one predetermined criterion, and the presenter 20 may search a plurality of master blueprint options 26g for the at least one predetermined criterion. The at least one predetermined criterion may include at least one of a number of bedrooms, a number of bathrooms, and a number of floor levels, or any other suitable predetermined criterion.

The presenter 20 may present one or more of the structural anchor options 26a, the block options 26b, the variation options 26d, and the styles 26f to the user 28. The user 28 may select one or more of the structural anchor options 26a, the block options 26b, the variation options 26d, and the styles 26f. In some implementations, the selecting by the user 28 may include a drill-down process of sequentially selecting the one or more of the structural anchor options 26a, the block options 26b, the variation options 26d, and the styles 26f.

The blueprint compositor 22 may generate a code based on the selected master blueprint 26g and the selected structural anchor options 26a, the block options 26b, the variation options 26d, and the styles 26f. The blueprint compositor 22 may convert the code to a unique key. In some implementations, each of the plurality of blueprint component options 26 that are selected are encoded with a unique identifier.

In some implementations, the unique key may be an SHA-512 hash-encoded key based on the code and generated by the blueprint compositor 22. The SHA-512 hash may also act as a key to any associated files and renderings to link renderings to blueprint component options 26. In other implementations, the unique key may be a Base64 encoded key based on the SHA-512 hash-encoded key and/or the code and generated by the blueprint compositor 22.

After the user 28 has made all selections, the blueprint compositor 22 may produce a single composited blueprint containing the selections. The renderings associated with each of the selections may also be made available for presentation, as needed.

Figure 4:
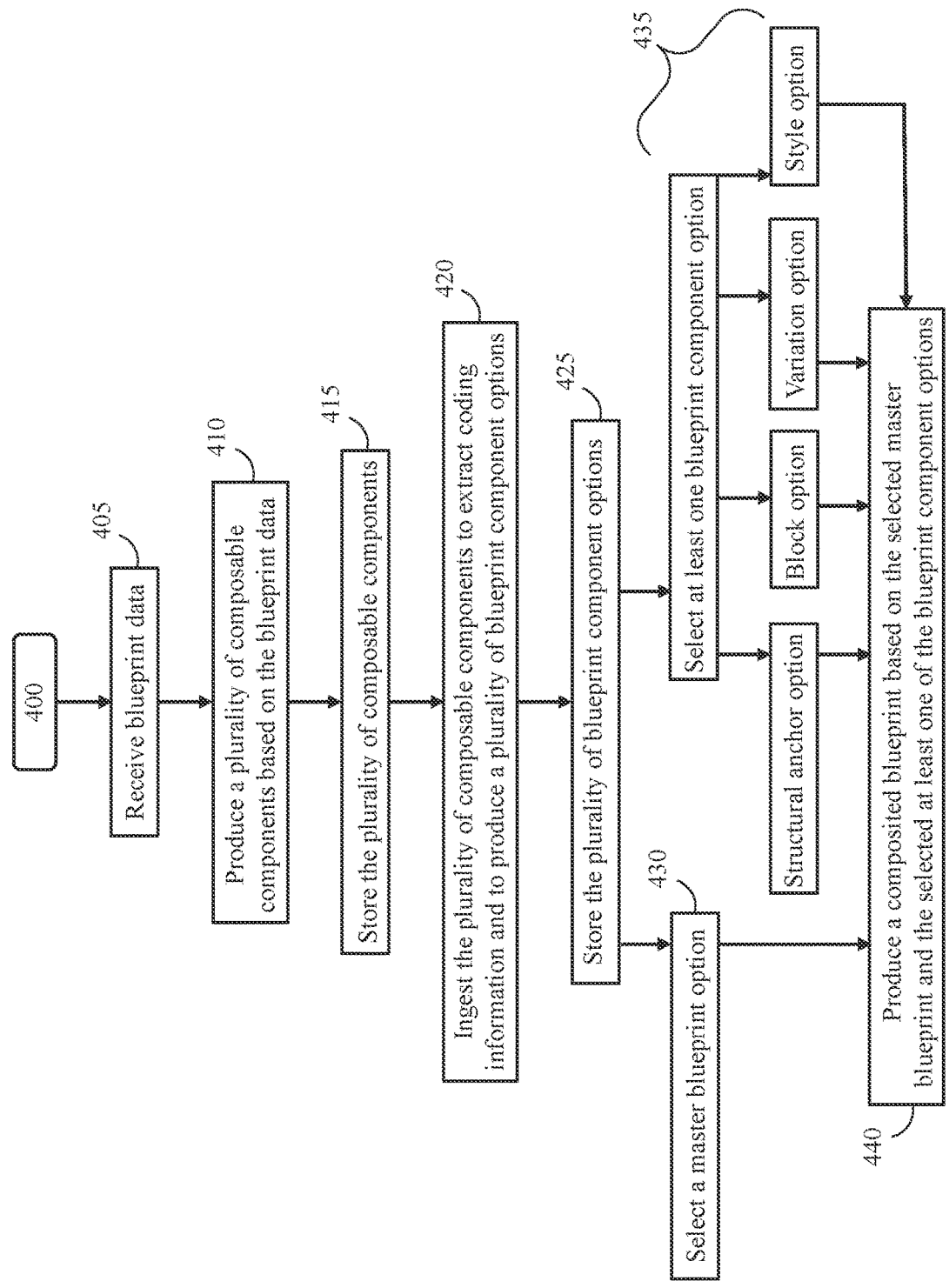
FIG. 4 illustrates a flow diagram of a method of compositing a blueprint.

FIG. 4 illustrates a flow diagram for an exemplary method 400 for compositing a blueprint. At 405, the method 400 may receive blueprint data of multiple, independently developed blueprints. At 410, the method 400 may code the blueprint data to produce a plurality of composable components.

At 415, the method 400 may store the plurality of composable components. At 420, the method 400 may ingest the plurality of composable components to extract coding information of the plurality of components and to produce a plurality of blueprint component options. The plurality of blueprint component options may include master blueprint options, structural anchor options, block options, variation options, and style options. At 425, the method 400 may store the plurality of blueprint component options.

At 430, the method 400 may select a master blueprint option. At 435, the method 400 may select at least one blueprint component option of the plurality of blueprint component options (e.g., select at least one of the structural anchor option, the block option, the variation option, or the style option.

At 440, the method 400 may produce a composited blueprint based, at least in part, on the selected master blueprint option and the selected at least one blueprint component option.

While FIG. 4 illustrates various actions occurring in serial, it is to be appreciated that various actions illustrated could occur substantially in parallel, and while actions may be shown occurring in parallel, it is to be appreciated that these actions could occur substantially in series. While a number of processes are described in relation to the illustrated methods, it is to be appreciated that a greater or lesser number of processes could be employed and that lightweight processes, regular processes, threads, and other approaches could be employed. It is to be appreciated that other example methods may, in some cases, also include actions that occur substantially in parallel. The illustrated exemplary methods and other embodiments may operate in real-time, faster than real-time in a software or hardware or hybrid software/hardware implementation, or slower than real time in a software or hardware or hybrid software/hardware implementation.

While for purposes of simplicity of explanation, the illustrated methodologies are shown and described as a series of blocks, it is to be appreciated that the methodologies are not limited by the order of the blocks, as some blocks can occur in different orders or concurrently with other blocks from that shown and described. Moreover, less than all the illustrated blocks may be required to implement an example methodology. Furthermore, additional methodologies, alternative methodologies, or both can employ additional blocks, not illustrated.

In the flow diagram, blocks denote "processing blocks" that may be implemented with logic. The processing blocks may represent a method step or an apparatus element for performing the method step. The flow diagrams do not depict syntax for any particular programming language, methodology, or style (e.g., procedural, object-oriented). Rather, the flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques.

FIG. 5 illustrates exemplary pseudocode 500 representing instructions executable to perform compositing operations in a memory in accordance with the techniques of the present disclosure. While exemplary pseudocode has been illustrated, it is to be understood that any suitable instructions executable to perform the compositing operations in a memory in accordance with the techniques of the present disclosure may be utilized.

FIG. 6 illustrates a block diagram of an exemplary machine 600 for compositing a blueprint. The machine 600 includes a processor 602, a memory 604, I/O Ports 610, and a file system 612 operably connected by a bus 608.

In one example, the machine 600 may transmit input and output signals via, for example, I/O Ports 610 or I/O Interfaces 618. The machine 600 may also include the composable blueprint product 10 and its associated components. Thus, the composable blueprint 10, and its associated components, may be implemented in machine 600 as hardware, firmware, software, or combinations thereof and, thus, the machine 600 and its components may provide means for performing functions described herein as performed by the composable blueprint product 10, and its associated components.

The processor 602 can be a variety of various processors including dual microprocessor and other multi-processor architectures. The memory 604 can include volatile memory or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 606 may be operably connected to the machine 600 via, for example, an I/O Interfaces (e.g., card, device) 618 and an I/O Ports 610. The disk 606 can include, but is not limited to, devices like a magnetic disk drive, a solid state disk drive, a floppy disk drive, a tape drive, a Zip drive, a flash memory card, or a memory stick. Furthermore, the disk 606 can include optical drives like a CD-ROM, a CD recordable drive (CD-R drive), a CD rewriteable drive (CD-RW drive), or a digital video ROM drive (DVD ROM). The memory 604 can store processes 614 or data 616, for example. The disk 606 or memory 604 can store an operating system that controls and allocates resources of the machine 600.

The bus 608 can be a single internal bus interconnect architecture or other bus or mesh architectures. While a single bus is illustrated, it is to be appreciated that machine 600 may communicate with various devices, logics, and peripherals using other busses that are not illustrated (e.g., PCIE, SATA, Infiniband, 1394, USB, Ethernet). The bus 608 can be of a variety of types including, but not limited to, a memory bus or memory controller, a peripheral bus or external bus, a crossbar switch, or a local bus. The local bus can be of varieties including, but not limited to, an industrial standard architecture (ISA) bus, a microchannel architecture (MCA) bus, an extended ISA (EISA) bus, a peripheral component interconnect (PCI) bus, a universal serial (USB) bus, and a small computer systems interface (SCSI) bus.

The machine 600 may interact with input/output devices via I/O Interfaces 618 and I/O Ports 610. Input/output devices can include, but are not limited to, a keyboard, a microphone, a pointing and selection device, cameras, video cards, displays, disk 606, network devices 620, and the like. The I/O Ports 610 can include but are not limited to, serial ports, parallel ports, and USB ports.

The machine 600 can operate in a network environment and thus may be connected to network devices 620 via the I/O Interfaces 618, or the I/O Ports 610. Through the network devices 620, the machine 600 may interact with a network. Through the network, the machine 600 may be logically connected to remote devices. The networks with which the machine 600 may interact include, but are not limited to, a local area network (LAN), a wide area network (WAN), and other networks. The network devices 620 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and the like. Similarly, the network devices 620 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, or through a network may include combinations and mixtures of communications.

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A machine or group of machines for compositing a blueprint, comprising:
one or more processors configured to;
select a master blueprint;
choose at least one blueprint component option, the at least one blueprint component option including at least one of a structural anchor option, a block option, and a variation option;
generate a code based on the selected master blueprint and the chosen at least one blueprint option, wherein the generating the code includes at least one of defining the structural anchors option according to a pre-defined, coded layer naming system including at least two of an anchor name section, an anchor option name section, and an anchor component section, defining the block option according to the pre-defined, coded layer naming system including at least two of a block area name section, a block target option name section, a block option name section, and a block component section, and defining the variation option according to the pre-defined coded layer naming system including at least two of a variation area name section, a variation target option name section, a variation name section, and a variation option section; and
convert the code to a unique encoded key.

2. The machine or group of machines of claim 1, wherein the selecting the master blueprint includes searching a plurality of master blueprints for at least one predetermined criterion.

3. The machine or group of machines of claim 2, wherein the at least one predetermined criterion includes at least one of a number of bedrooms, a number of bathrooms, and a number of floor levels.

4. The machine or group of machines of claim 1, wherein the selecting includes presenting a subset of master blueprints of the plurality of master blueprints, the subset of master blueprints satisfying the at least one predetermined criterion.

5. The machine or group of machines of claim 1, wherein the choosing may include a drill-down process of sequentially selecting the at least one of the structural anchor option, the block option, and the variation option.

6. The machine or group of machines of claim 1, wherein the converting includes generating an SHA-512 hash encoded key based on the code.

7. The machine or group of machines of claim 1, wherein the converting includes generating a Base64 encoded key based on the code.

8. A method of compositing a blueprint, comprising:
selecting a master blueprint;
choosing at least one blueprint component option, the at least one blueprint component option including at least one of a structural anchor option, a block option, and a variation option;
generating a code based on the selected master blueprint and the chosen at least one blueprint option, wherein the generating the code includes at least one of defining the structural anchors option according to a pre-defined, coded layer naming system including at least two of an anchor name section, an anchor option name section, and an anchor component section, defining the block option according to the pre-defined, coded layer naming system including at least two of a block area name section, a block target option name section, a block option name section, and a block component section, and defining the variation option according to the pre-defined coded layer naming system including at least two of a variation area name section, a variation target option name section, a variation name section, and a variation option section; and
converting the code to a unique encoded key.

9. The method of claim 8, wherein the selecting the master blueprint includes searching a plurality of master blueprints for at least one predetermined criterion.

10. The method of claim 9, wherein the at least one predetermined criterion includes at least one of a number of bedrooms, a number of bathrooms, and a number of floor levels.

11. The method of claim 8, wherein the selecting includes presenting a subset of master blueprints of the plurality of master blueprints, the subset of master blueprints satisfying the at least one predetermined criterion.

12. The method of claim 8, wherein the choosing may include a drill-down process of sequentially selecting the at least one of the structural anchor option, the block option, and the variation option.

13. The method of claim 8, wherein the converting includes generating an SHA-512 hash encoded key based on the code.

14. The method of claim 8, wherein the converting includes generating a Base64 encoded key based on the code.

15. A computer program product for compositing a blueprint, the computer program product being tangibly stored on a non-transient computer-readable medium and comprising machine executable instructions, which, when executed, cause the machine to perform steps of a method, comprising:
one or more processors configured to;
select a master blueprint;
choose at least one blueprint component option, the at least one blueprint component option including at least one of a structural anchor option, a block option, and a variation option;
generate a code based on the selected master blueprint and the chosen at least one blueprint option, wherein the generating the code includes at least one of defining the structural anchors option according to a pre-defined, coded layer naming system including at least two of an anchor name section, an anchor option name section, and an anchor component section, defining the block option according to the pre-defined, coded layer naming system including at least two of a block area name section, a block target option name section, a block option name section, and a block component section, and defining the variation option according to the pre-defined coded layer naming system including at least two of a variation area name section, a variation target option name section, a variation name section, and a variation option section; and
convert the code to a unique encoded key.

16. The computer program product of claim 15, wherein the selecting the master blueprint includes searching a plurality of master blueprints for at least one predetermined criterion.

17. The computer program product of claim 16, wherein the at least one predetermined criterion includes at least one of a number of bedrooms, a number of bathrooms, and a number of floor levels.

18. The computer program product of claim 15, wherein the selecting includes presenting a subset of master blueprints of the plurality of master blueprints, the subset of master blueprints satisfying the at least one predetermined criterion.

19. The computer program product of claim 15, wherein the choosing may include a drill-down process of sequentially selecting the at least one of the structural anchor option, the block option, and the variation option.

20. The computer program product of claim 15, wherein the converting includes generating a SHA-512 hash encoded key based on the code.

* * * * *